United States Patent [19]

McCutcheon

[11] Patent Number: 5,971,350
[45] Date of Patent: Oct. 26, 1999

[54] HEIGHT ADJUSTMENT OR LEVELLING APPARATUS

[75] Inventor: Stephen McLay McCutcheon, Auckland, New Zealand

[73] Assignee: Fisher & Paykel Limited, Auckland, New Zealand

[21] Appl. No.: 09/065,179

[22] Filed: Apr. 23, 1998

[30] Foreign Application Priority Data

Apr. 23, 1997 [NZ] New Zealand .......................... 314660

[51] Int. Cl.⁶ .................................................. F16M 5/00
[52] U.S. Cl. ...................................... 248/688; 248/188.2
[58] Field of Search ................................... 248/688, 685, 248/649, 188.2, 650, 188.3, 188.4, 188.5, 188.8

[56] References Cited

U.S. PATENT DOCUMENTS

| | | |
|---|---|---|
| 3,844,578 | 10/1974 | Matyskella et al. . |
| 3,856,248 | 12/1974 | Labelle . |
| 4,783,879 | 11/1988 | Weaver . |
| 4,789,879 | 12/1988 | Murakami . |
| 4,955,569 | 9/1990 | Hottmann ............................. 248/188.4 |
| 5,080,319 | 1/1992 | Nielsen ................................. 248/188.2 |
| 5,215,367 | 6/1993 | Montuoro et al. . |

FOREIGN PATENT DOCUMENTS 644541  12/1993  Australia .

*Primary Examiner*—Ramon O. Ramirez
*Attorney, Agent, or Firm*—Trexler, Bushnell, Giangiorgi & Blackstone, Ltd.

[57] ABSTRACT

A mechanism for adjusting the height of at least a part of an item or article, for example a home appliance such as a refrigerator, dishwasher or laundry washing machine. The device includes two parts and is adapted to replace at least a front foot of the item. A first part of the device is an enlarged diameter thumb wheel which is rotated by a user. The thumb wheel is held within a captive nut within the appliance thus rotation of the thumb wheel increases or decreases the height of the appliance from the floor. The second part of the device is a disk which is held captive within the thumb wheel but which is in contact with the floor. The materials selected and the geometry of the mating surfaces of the two components is chosen such that a low co-efficient of friction is produced between them.

15 Claims, 4 Drawing Sheets

HEIGHT ADJUSTMENT OR LEVELLING APPARATUS

BACKGROUND OF THE INVENTION

1. Field of the Invention

This invention relates to height adjustment or levelling mechanisms for equipment and more particularly though not solely to height adjustment or levelling mechanisms for home appliances such as refrigerators.

2. Description of the Prior Art

Modern levelling foot devices for home appliances, in addition to providing height adjustment of the appliance, increasingly include the addition of wheels or castors to allow the appliance to be moved. However, in order for the levelling foot device to be of benefit to the average household member, the mechanism must be readily accessible and easily adjusted. Early height adjustment mechanisms for home appliances simply consisted of a captive nut in the base of the front of the appliance into which a bolt could be wound (usually requiring a hand tool) to adjust the height (with the bolt head acting as a foot on the ground and rotation of the bolt head adjusting the distance between the head and the captive nut). This system usually requires one person to lift and hold the front of the appliance while a second person adjusts the height of the feet.

Improvements to the above system are disclosed in United States patent numbers U.S. Pat. No. 3,844,578 (Westinghouse Electric Corporation), U.S. Pat. No. 3,856,248 (Labelle), U.S. Pat. No. 3,858,270 (General Electric Company), U.S. Pat. No. 4,783,879 (White Consolidated Industries) and U.S. Pat. No. 5,215,367 (Amana Refrigeration Inc.). Each of the above mechanisms suffer from unnecessary complexity and/or difficulty of use (usually requiring hand tools for adjustment).

An example of a combination height adjustment and roller support mechanism for a refrigerator is disclosed in our New Zealand patent No.239676 published on Feb. 24, 1995 (equivalent to Australian patent No.644541 issued Apr. 22, 1994). The device described therein includes a rotatable hand wheel at the base of the front of the appliance which a user rotates by hand to adjust the height of the front of the appliance (assisted by a fulcrum arrangement). However, it has been found that the user sometimes has difficulty in rotating the hand wheel due to the frictional coupling between the shaft of the hand wheel and its housing within the refrigerator cabinet.

It is, therefore, an object of the present invention to provide height adjustment apparatus for equipment which will go at least some way towards overcoming the above disadvantages or which will at least provide the public with a useful choice.

Accordingly, the invention consists in height adjustment apparatus for varying the height of at least a part of an item of equipment above a support surface, comprising:

fixed locating means which in use is mounted in a base of said item of equipment, threaded shaft means, adapted to be received by said locating means so that relative rotation there between produces axial movement of said shaft means in relation to said base, rotatable adjusting means having an end of said threaded shaft means fixed therein and a first bearing surface, support surface contacting means adapted to contact said support surface and having a second bearing surface, said second bearing surface adapted to contact said first bearing surface to allow relative rotational movement between said rotatable adjusting means and said support surface contacting means, rotation of said rotatable adjusting means thereby adjusting the height of said at least part of an item of equipment.

The invention consists in the foregoing and also envisages constructions of which the following gives examples.

BRIEF DESCRIPTION OF THE DRAWINGS

One preferred form of the present invention will now be described with reference to the accompanying drawings in which.

DETAILED DESCRIPTION OF THE PREFERRED EMBODIMENT

Figure 1:
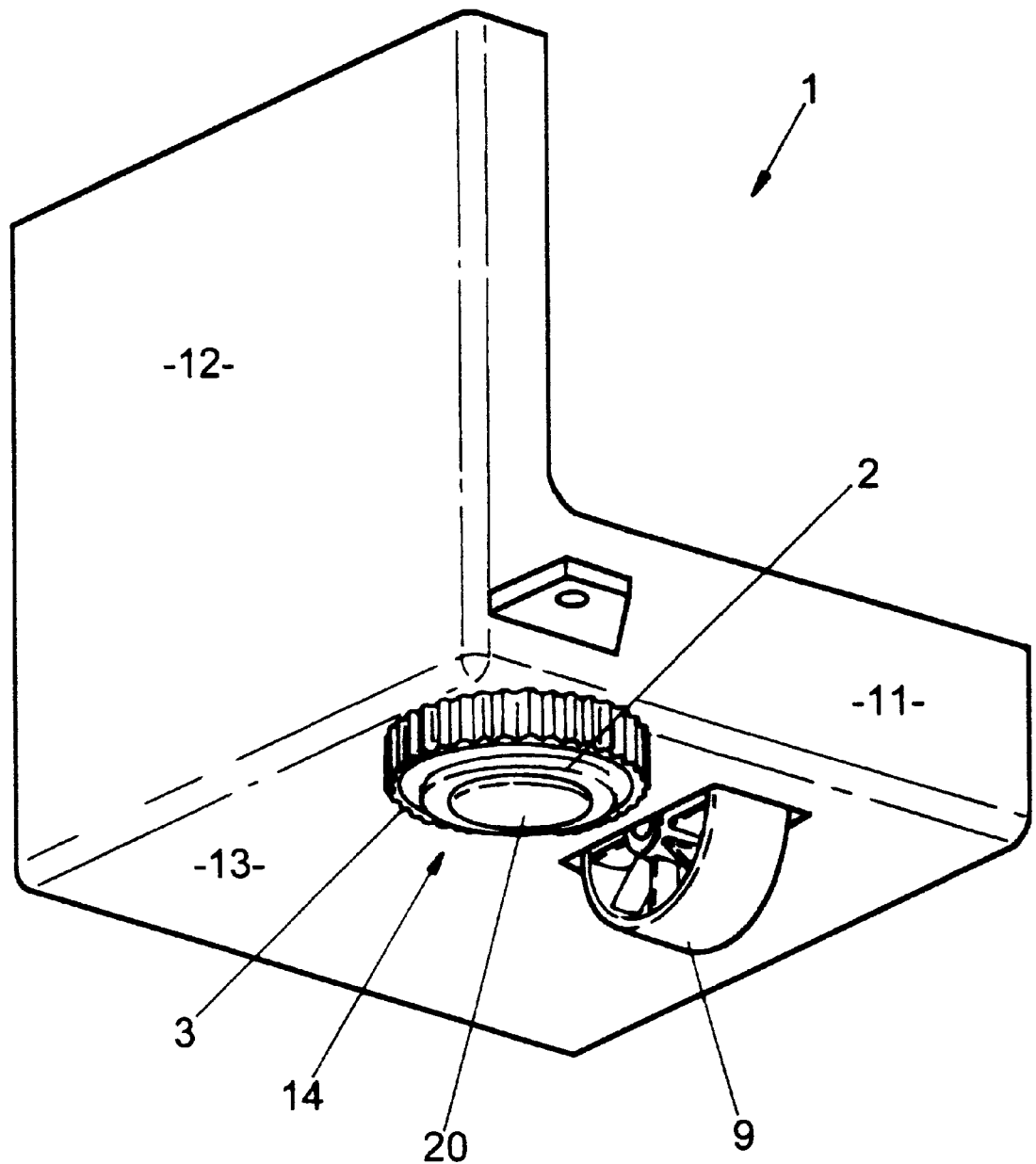
FIG. 1 is a perspective view from below of a refrigerator corner piece incorporating the height adjustment or levelling apparatus according to the present invention.

With reference to the drawings, the height adjustment or levelling apparatus (generally referenced 14) according to a preferred form of the present invention is shown. With particular reference to FIG. 1, a corner piece 1 of an appliance (not shown), for example a refrigerator cabinet (suitable for insertion into the lower corner of a refrigerator cabinet) is shown having a front wall 11, side wall 12 and base 13. A wheel 9 is fitted within a wheel housing 10 to allow the appliance to be easily transported when the wheel 9 is in contact with a support surface (not shown).

Figure 2:
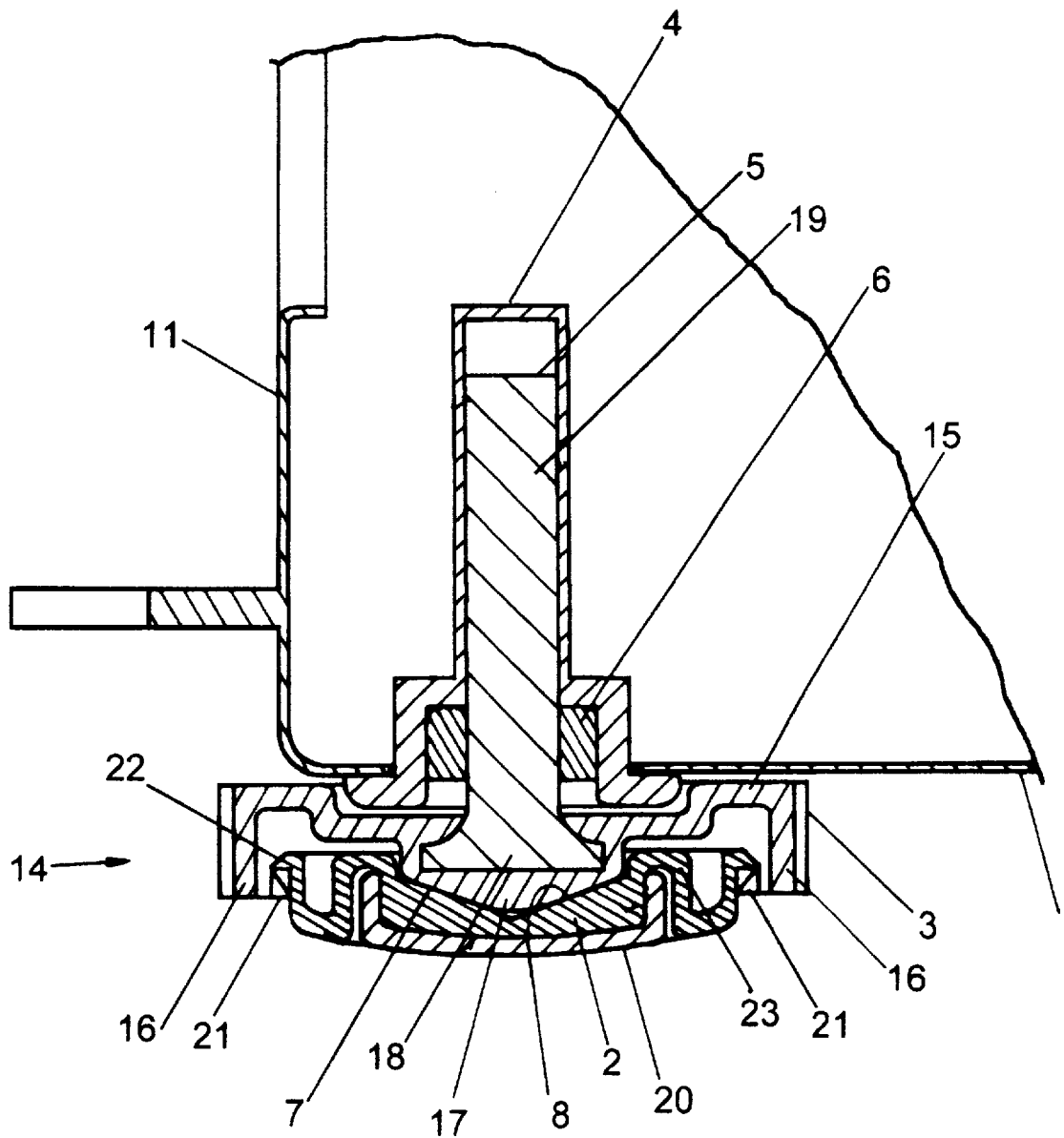
FIG. 2 is a cross-sectional front elevation of the corner piece of FIG. 1 including the height adjustment or levelling apparatus.

With reference also to FIG. 2, the height adjustment or levelling apparatus includes a rotatable adjusting means or hand wheel 3 which is rotatable by a user and which is preferably moulded or otherwise manufactured from a plastics material such as NYLON. Hand wheel 3 is substantially "lid" shaped or cylindrical with a base 15 and circular side wall 16. Protruding from base 15 is a substantially convex or conically shaped protrusion 17, the surface of which defines a first bearing surface 7. Threaded shaft means 5, which may comprise a bolt has its head 18 embedded within protrusion 17 and its shaft 19 extending away from the base 15 of hand wheel 3 into the corner piece 1. The bolt head 18 is fixed such that rotation of hand wheel 3 also causes rotation of bolt 5. Side wall 16 of rotatable hand wheel 3 includes an annular, inwardly directed lip 21 around the lower part of its inner surface. Alternatively (as shown) the lip could comprise a number of inwardly protruding wedge shaped lip means (8 are shown).

A support surface contacting means or footing disk 2 fits within the open side of hand wheel 3 and serves to bear at least part of the weight of the appliance (one height adjustment or levelling apparatus according to the present invention could be provided, for example, for each front corner of an appliance). Disk 2 has a smooth substantially convex outer surface which is adapted to contact the support surface (when the disk 2 is wound down to a level lower than the lowest point of wheel 9). Disk 2 is preferably moulded or otherwise manufactured from a plastics material such as ACETAL and also includes a substantially cylindrically shaped ring protrusion 23 on its upper side which is directed in use towards protrusion 17 on the base of hand wheel 3. The internal surface of ring protrusion 23 is substantially concave or conical in shape and defines a second bearing surface 8 which is adapted to contact the first bearing surface 7 in use. Due to the low co-efficient of friction between the two materials selected for the disk 2 and hand wheel 3, hand wheel 3 may be relatively easily rotated even when much of the weight of the appliance is being supported by the levelling apparatus. The ring protrusion 23 is preferably a close fit around the convex protrusion 17 which also ensures that the disk 2 is centred in the required position within the hand wheel 3.

In an alternative preferred embodiment, pad means 20 which may for example be a rubber pad, is attached to the lower surface of disk 2. Pad 20 would then be the only part of the levelling apparatus which contacts the support surface in use. Pad 20 would be advantageous as it would provide increased friction between the support surface and the levelling apparatus so that the appliance would not so easily slide on the support surface and rotation of the hand wheel 3 would not easily also rotate the disk 2. As shown, the pad 20 could be formed as a cap which fits over a circular protusion in the disk 2 in order to improve the connection between pad and disk.

At the outer edge of disk 2, an outwardly extending annular lip 22 is provided. Lip 22 and lip 21 engage to ensure that disk 2 is held captive within hand wheel 3. Insertion of disk 2 into hand wheel 3 is simply a matter of pressing the two parts together and providing sufficient force to flex the side wall 16 of the hand wheel outward and to flex the lip 22 of disk 2 inward to allow the lips to pass each other and then engage.

Figure 3:
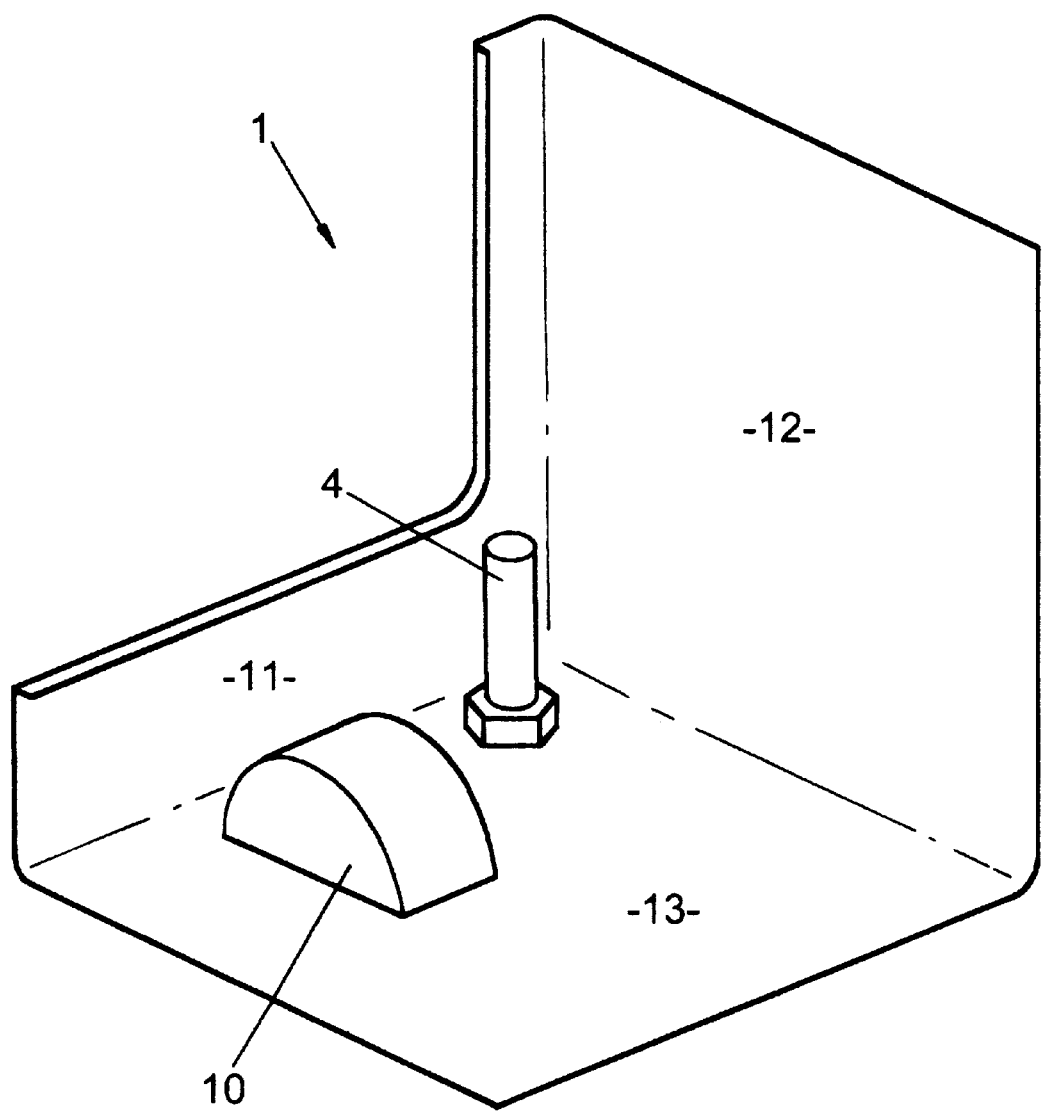
FIG. 3 is a perspective view from above of the interior of the corner piece of FIG. 1.
Figure 4:
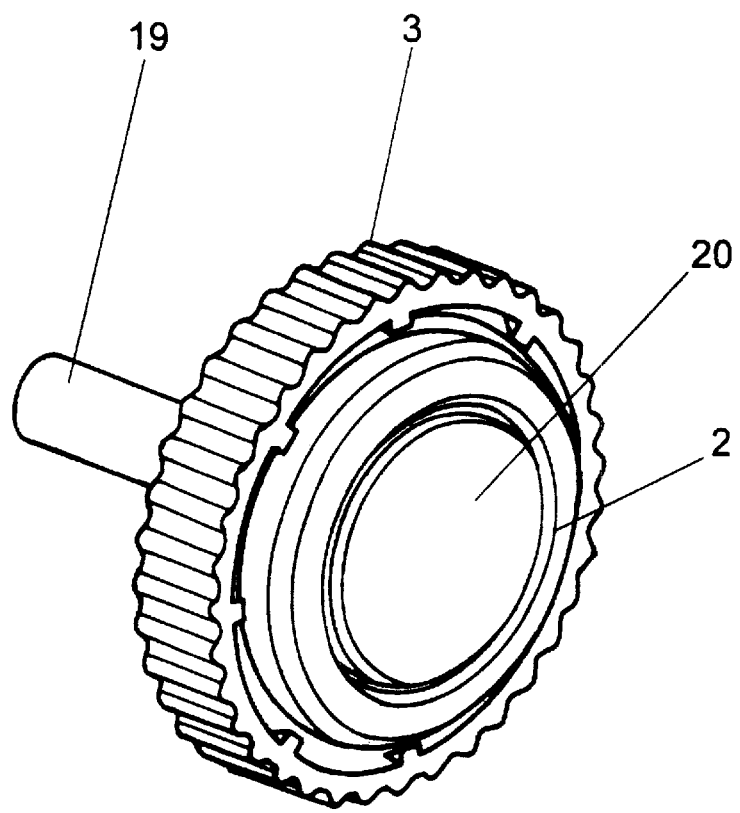
FIG. 4 is a perspective view of the height adjustment or levelling apparatus shown in FIG. 1 on its side.
Figure 5:
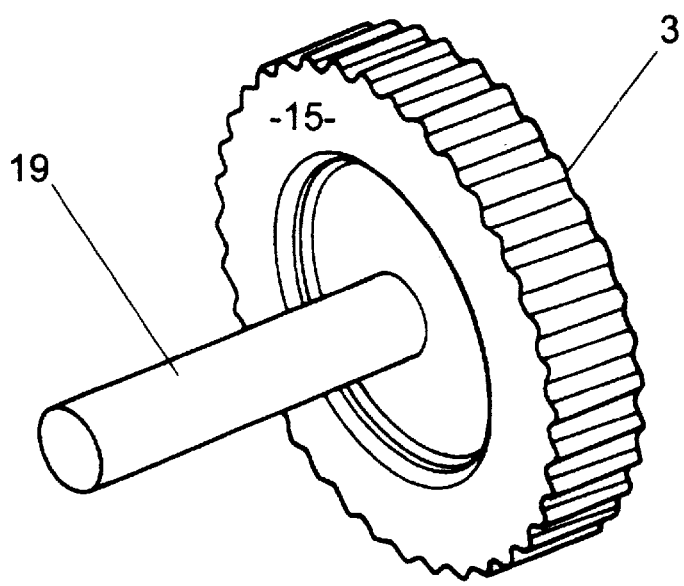
FIG. 5 is another perspective view of the height adjustment or levelling apparatus shown in FIG. 1.

A thread cover piece 4 protrudes through the base 13 of corner piece 1 as may also be seen in FIG. 3. Thread cover 4 provides a protective housing for bolt 5, especially in the case of the present invention being incorporated into a refrigerator cabinet which is to be filled with insulative foam.

A fixed locating means 6, which preferably comprises a threaded nut with an internal diameter and thread type suitable for fastening to bolt 5, is fixed to the corner piece 1 so that it is substantially immobile. In the preferred embodiment shown in the drawings, nut 6 is held captive within a section of thread cover 4, the thread cover also being immobile through its fixed connection to the corner piece 1.

In use, in order to install and then adjust the height of or level an appliance, a user simply ensures that the hand wheel 3 is fully wound in a clockwise direction (for a right handed threaded bolt and nut) so that hand wheel 3 and captive disk 2 are drawn towards the base 13 of the appliance so that wheel 9 contacts the support surface, and then positions the appliance appropriately. Height adjustment is then achieved by winding hand wheel 3 in an anti-clockwise direction until disk 2 (or pad 20) contacts the support surface and begins to take the weight of the appliance, lifting wheel 9 from the support surface. As more weight is taken up by the levelling apparatus of the present invention, disk 2 will tend not to rotate with respect to the support surface but relative movement between the first 7 and second 8 bearing surfaces will occur due to the lower frictional coupling developed between the two materials. As the hand wheel 3 is rotated, bolt 5 will be withdrawn further from the appliance, increasing the displacement between the support surface and the base of the appliance as desired.

Due to the increased diameter of the hand wheel 3 and the construction and material choice of the height adjustment or levelling apparatus, the present invention is simple and convenient to use and allows for effortless height adjustment of relatively large and heavy appliances in comparison to the prior art.

I claim:

1. Height adjustment apparatus for varying the height of at least a part of an item of equipment above a support surface, comprising:

fixed locating means which in use is adapted to be mounted in a base of said item of equipment, threaded shaft means, adapted to be received by said locating means so that relative rotation there between produces axial movement of said shaft means in relation to said fixed locating means, rotatable adjusting means having an end of said threaded shaft means fixed therein, such that rotation of said adjusting means causes rotation of said threaded shaft means, and a first bearing surface facing downward, a support surface contacting member having a downwardly facing contacting surface adapted to contact said support surface and a second bearing surface facing upward, said first bearing surface bearing against said second bearing surface and said bearing surfaces adapted to contact with limited friction to promote relative rotational movement between said rotatable adjusting means and said support surface contacting member rather than between said support surface contacting member and said support surface upon rotation of said rotatable adjusting means to the height of said at least part of said item of equipment, and retaining means to retain said support surface contacting member adjacent said rotatable adjusting means with said first and second bearing surfaces adjacent one another.

2. Height adjustment apparatus as claimed in claim 1 wherein said support surface contacting member comprise a disk having a substantially convex lower surface adapted to contact said support surface and said rotatable adjusting means comprise a substantially lid shape having a base and side wall, said support surface contacting member adapted to be housed substantially within said rotatable adjusting means with a part of said convex disk protruding from the open side thereof.

3. Height adjustment apparatus as claimed in claim 2 wherein said retaining means comprises a lip provided on the outer edge of said support surface contacting member and a complementary lip provided on the lower edge of said wall of said rotatable adjusting means such that said support surface contacting member may be held captive within said rotatable adjusting means, said lip and said complementary lip engaging to hold said support surface contacting member within said rotatable adjusting means.

4. Height adjustment apparatus as claimed in claim 3 wherein said complementary lip comprises a number of lip protrusions spread around the inner surface of said side wall of said rotatable adjusting means.

5. Height adjustment apparatus as claimed in claim 1 or claim 2 wherein said fixed locating means are held in location in said base by a thread covering sheath in which said threaded shaft means are axially movable.

6. Height adjustment apparatus as claimed in claim 1 or claim 2 wherein said first bearing surface comprises a convex shaped protrusion directed towards said support surface contacting member and said second bearing surface comprises a convex shaped receptacle to allow relative location of said support surface contacting member and said rotatable adjusting means.

7. Height adjustment apparatus as claimed in claim 1 or claim 2 wherein the materials from which said support surface contacting member and said rotatable adjusting means are formed is chosen so that the co-efficient of friction between said first and said second bearing surfaces is low.

8. Height adjustment apparatus as claimed in claim 7 wherein said support surface contacting member is made from Acetal and said rotatable adjusting means is made from NYLON.

9. Height adjustment apparatus as claimed in claim 1 or claim 2 wherein said height adjustment apparatus also comprise pad means attached to said support surface contacting member and adapted in use to contact said support surface.

10. Height adjustment apparatus for varying the height of at least a part of an item of equipment above a support surface, comprising:

fixed locating means which in use is adapted to be mounted in a base of said item of equipment, threaded shaft means, adapted to be received by said locating means so that relative rotation there between produces axial movement of said shaft means in relation to said base, rotatable adjusting means having an end of said threaded shaft means fixed therein and a first bearing surface, a support surface contacting member adapted to contact said support surface and having a second bearing surface, said second bearing surface adapted to contact said first bearing surface to allow relative rotational movement between said rotatable adjusting means and said support surface contacting member, rotation of said rotatable adjusting means thereby adjusting the height of said at least part of said item of equipment, said support surface contacting means comprise a disk having a substantially convex lower surface adapted to contact said support surface and said rotatable adjusting means comprise a substantially lid shape having a base and side wall, said support surface contacting means adapted to be housed substantially within said rotatable adjusting means with a part of said convex disk protruding from the open side thereof, said first bearing surface comprises a convex shaped protrusion directed towards said support surface contacting member and said second bearing surface comprises a convex shaped receptacle to allow relative location of said support surface contacting member and said rotatable adjusting means.

11. Height adjustment apparatus for varying the height of at least a part of an item of equipment above a support surface, comprising:

fixed locating means which in use is adapted to be mounted in a base of said item of equipment, threaded shaft means, adapted to be received by said locating means so that relative rotation there between produces axial movement of said shaft means in relation to said base, rotatable adjusting means having an end of said threaded shaft means fixed therein and a first bearing surface, a support surface contacting member adapted to contact said support surface and having a second bearing surface, said second bearing surface adapted to contact said first bearing surface to allow relative rotational movement between said rotatable adjusting means and said support surface contacting member, rotation of said rotatable adjusting means thereby adjusting the height of said at least part of said item of equipment, said support surface contacting means comprise a disk having a substantially convex lower surface adapted to contact said support surface and said rotatable adjusting means comprise a substantially lid shape having a base and side wall, said support surface contacting means adapted to be housed substantially within said rotatable adjusting means with a part of said convex disk protruding from the open side thereof, the outer edge of said support surface contacting member is provided with a lip and the lower edge of said wall of said rotatable adjusting means is provided with a complementary lip such that said support surface contacting member may be held captive within said rotatable adjusting means, said lip and said complementary lip engaging to hold said support surface contacting member within said rotatable adjusting means.

12. Height adjustment apparatus as claimed in claim 11, wherein said complementary lip comprises a number of lip protrusions spread around the inner surface of said side wall of said rotatable adjusting means.

13. Height adjustment apparatus for varying the height of at least a part of an item of equipment above a support surface, comprising:

fixed locating means which in use is adapted to be mounted in a base of said item of equipment, threaded shaft means, adapted to be received by said locating means so that relative rotation there between produces axial movement of said shaft means in relation to said base, rotatable adjusting means having an end of said threaded shaft means fixed therein and a first bearing surface, a support surface contacting member adapted to contact said support surface and having a second bearing surface, said second bearing surface adapted to contact said first bearing surface to allow relative rotational movement between said rotatable adjusting means and said support surface contacting member, rotation of said rotatable adjusting means thereby adjusting the height of said at least part of said item of equipment, said fixed locating means are held in location in said base by a thread covering sheath in which said threaded shaft means are axially movable.

14. Height adjustment apparatus for varying the height of at least a part of an item of equipment above a support surface, comprising:

fixed locating means which in use is adapted to be mounted in a base of said item of equipment, threaded shaft means, adapted to be received by said locating means so that relative rotation there between produces axial movement of said shaft means in relation to said base, rotatable adjusting means having an end of said threaded shaft means fixed therein and a first bearing surface, a support surface contacting member adapted to contact said support surface and having a second bearing surface, said second bearing surface adapted to contact said first bearing surface to allow relative rotational movement between said rotatable adjusting means and said support surface contacting member, rotation of said rotatable adjusting means thereby adjusting the height of said at least part of said item of equipment, said support surface contacting means comprise a disk having a substantially convex lower surface adapted to contact said support surface and said rotatable adjusting means comprise a substantially lid shape having a base and side wall, said support surface contacting means adapted to be housed substantially within said rotatable adjusting means with a part of said convex disk protruding from the open side thereof, said fixed locating means are held in location in said base by a thread covering sheath in which said threaded shaft means are axially movable.

15. Height adjustment apparatus for varying the height of at least a part of an item of equipment above a support surface, comprising:

fixed locating means which in use is adapted to be mounted in a base of said item of equipment, threaded shaft means, adapted to be received by said locating means so that relative rotation there between produces axial movement of said shaft means in relation to said base, rotatable adjusting means having an end of said threaded shaft means fixed therein and a first bearing surface, a support surface contacting member adapted to contact said support surface and having a second bearing surface, said second bearing surface adapted to contact said first bearing surface to allow relative rotational movement between said rotatable adjusting means and said support surface contacting member, rotation of said rotatable adjusting means thereby adjusting the height of said at least part of said item of equipment, said first bearing surface comprises a convex shaped protrusion directed towards said support surface contacting member and said second bearing surface comprises a convex shaped receptacle to allow relative location of said support surface contacting member and said rotatable adjusting means.

* * * * *